United States Patent [19]
Wanner et al.

[11] 3,737,170
[45] June 5, 1973

[54] CHUCK FOR HAMMER DRILLS OR THE LIKE

[75] Inventors: Karl Wanner, Echterdingen; Manfred Bleicher; Horst Sigg, both of Stuttgart; Max Bürklin, Waldenbuch, all of Germany

[73] Assignee: Robert Bosch GmbH, Stuttgart, Germany

[22] Filed: Nov. 9, 1970

[21] Appl. No.: 88,011

[30] Foreign Application Priority Data
  Nov. 14, 1969   Germany..................P 19 57 289.5

[52] U.S. Cl..................................279/60, 279/1 W
[51] Int. Cl. ............................................B23b 31/04
[58] Field of Search..................279/16, 17, 69, 1 W, 279/1 Q, 60, 61, 62

[56] References Cited
UNITED STATES PATENTS 2,780,469   2/1957   Hull......................279/1 Q
2,553,990   5/1951   Vidal......................279/60
1,985,586   12/1934  Stoner.....................279/60

*Primary Examiner*—Francis S. Husar
*Attorney*—Michael S. Striker

[57] ABSTRACT

A self-centering drill chuck for use in hammer drills or like impact- and torque-transmitting machines. The shank of the boring or drilling tool is received between and is clamped by three jaws which are slidably guided in the pull-on nut or in the adapter of the chuck. A dished spring is inserted between the jaws and the adapter or nut to undergo deformation when the nut is rotated by a chuck key to thereby prevent a relaxation of the clamping force between the shank of the inserted tool and the jaws while the chuck rotates and receives axially oriented impacts.

7 Claims, 4 Drawing Figures

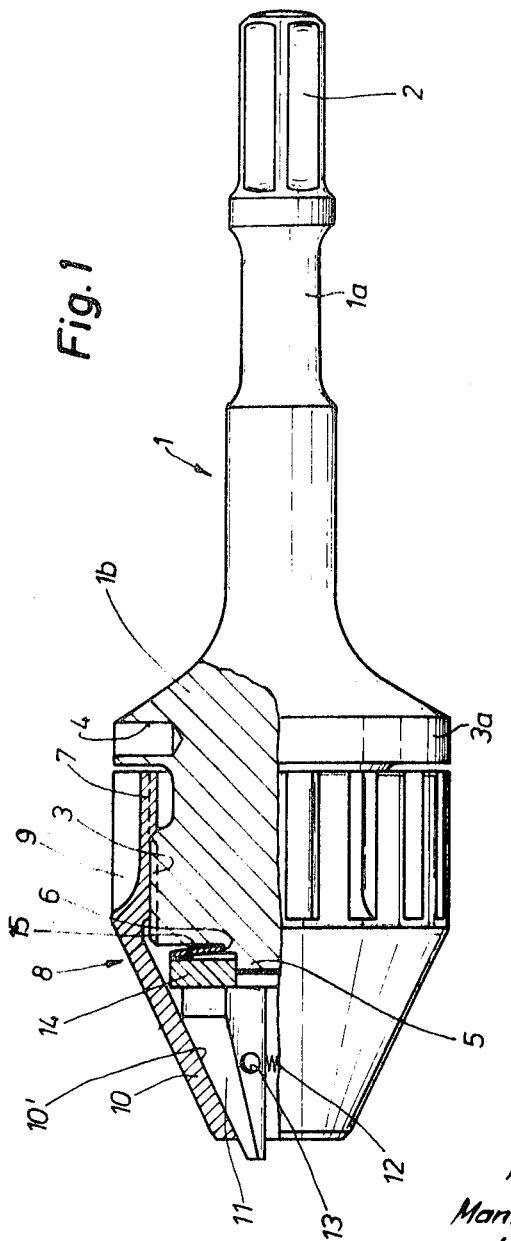

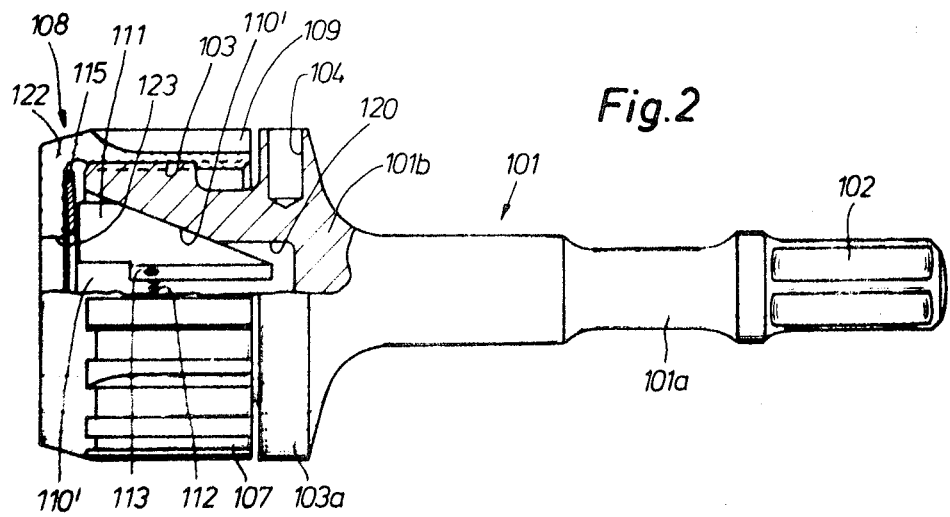
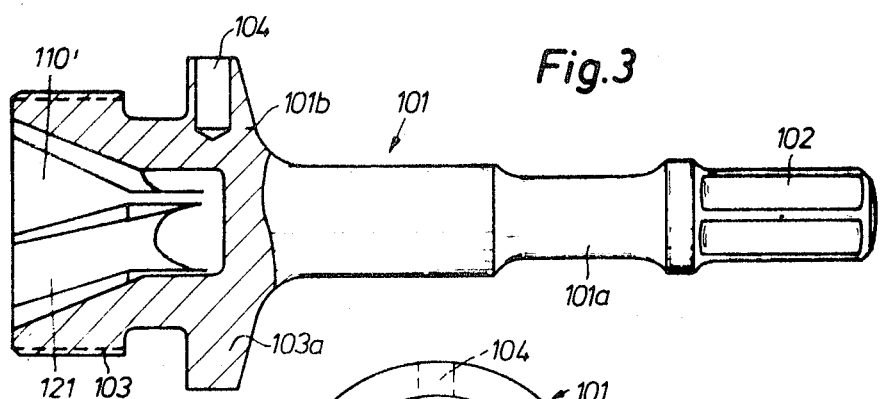
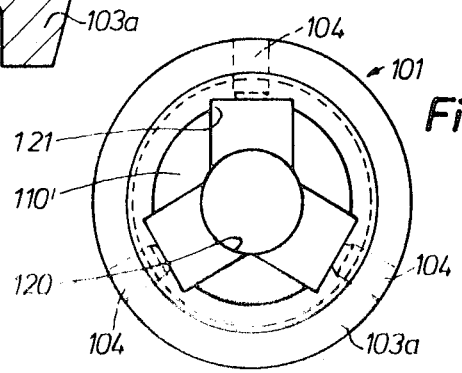
INVENTORS
Karl WANNER
Manfred BLEICHER
Horst SIGG
Max BÜRKLIN
BY
Michael S. Striker
their ATTORNEY

3,737,170

CHUCK FOR HAMMER DRILLS OR THE LIKE

BACKGROUND OF THE INVENTION

The present invention relates to tool retaining devices in general, and more particularly to improvements in chucks. Still more particularly, the invention relates to improvements in chucks which can be utilized in portable or stationary machines of the type wherein the tool which is to penetrate into a wall or the like is caused to rotate and simultaneously receives axially oriented impacts or shocks which tend to drive it into the material of the wall. In such chucks, the tool must be held with a substantial clamping force and must be designed in such a way that the clamping force is not reduced or unduly increased in response to repeated impacts.

It is already known to provide a chuck with three bores which extend radially of and make an acute angle with the axis of the adapter. Each of the bores receives a jaw and the jaws are caused to move toward each other in response to movements which are transmitted thereto by the clamped tool. Those portions of the jaws which extend from the respective bores have teeth which form portions of threads and mate with a ring gear which is connected with a pull-on nut; the latter is rotatable on the adapter of the chuck. Such rotation of the nut causes the ring gear to move the jaws toward each other and into engagement with the shank of an inserted tool. The adapter of the chuck has a groove which is flanked by the nut and by the ring gear and receives a rubber ring.

It is also known to insert a portion of a rubber ring between the adapter and the pull-on nut of a chuck for use in machines wherein the tool is caused to rotate and simultaneously receives axially oriented impacts which drive it into the material of a workpiece. When the chuck is used in a hammer drill or in an analogous impact generating machine, its parts must transmit torque as well as axially oriented blows. The strongly compressed rubber ring thereby serves to prevent uncontrolled and undesirable relaxation of clamping forces which hold the tool against movement with reference to the jaws.

The latest types of hammer drills and analogous machines are provided with chucks which must be capable of standing impacts exceeding at least 20 times (and normally at least 50 times) those produced by hammer drills which were developed as recently as 7 or 8 years ago. Therefore, the frictional force which must be generated by rubber inserts which are used in chucks for the latest types of impact generating machines is extremely high. Consequently, the force which is need to rotate the pull-on nut with reference to the adapter of a drill chuck is so large that it is extremely difficult to move the jaw into requisite clamping engagement with the inserted tool because such force must subject a rubber insert to an extremely high degree of compression. It was found that a customary chuck key is incapable of generating such forces.

SUMMARY OF THE INVENTION

An object of the invention is to provide a chuck which is particularly suited for use in hammer drills and like impact generating machines wherein the tool is rotated and is simultaneously subjected to axially oriented impacts, and to construct and assemble and chuck in such a way that the requisite clamping force can be generated and maintained with a minimal effort.

Another object of the invention is to provide a self-centering drill chuck wherein the requisite clamping force can be generated and maintained without excessive deformation of elastic parts.

A further object of the invention is to provide a chuck which can serve as a simple, compact, convenient and reliable tool retaining device in the latest types of machines wherein the tool is rotated and is simultaneously subjected to recurring axially oriented shocks of substantial magnitude.

Still another object of the invention is to provide a chuck which can be used for clamping of a variety of tools and which can be manipulated by resorting to conventional or specially designed chuck keys.

An ancillary object of the invention is to provide a chuck wherein a requisite clamping force can be generated without permanent deformation of or excessive wear upon its components parts.

Another object of the invention is to provide a drill chuck wherein the impacts on its parts contribute to more satisfactory clamping action upon the inserted tool.

The improved chuck is particularly suited for use in hammer drills and like power-operated machines wherein the tool is subjected to shocks or impacts, for example, to intermittent axially oriented impacts while the tool rotates to propagate itself into a workpiece. The chuck comprises a plurality of clamping elements including at least two jaws which are movable into clamping engagement with a tool, for example, with a drilling or boring tool, whereby the tool and the clamping elements together constitute a chain of parts which cooperate to hold the tool against undesired movement with reference to the jaws. In addition to the jaws and the tool, the parts of the chain include at least one elastic part (such as one or more dished springs) which is interposed between and deformed by at least two other parts of the chain. The thus deformed elastic part then prevents uncontrolled relaxation or excessive intensification of clamping forces when the chuck is in use.

The clamping elements of the chuck preferably include more than two (most preferably three) jaws, and such elements further include an adapter member whose stem can be coupled to the spindle of a power-operated machine and an adjusting member, preferably a pull-on nut which meshes with the adapter member. One of these members is provided with guide means or ways to slidably support and guide the jaws for movement toward and away from each other and the adjusting member is movable (rotatable) with reference to the adapter member to thereby effect movements of the jaws relative to each other.

The spring or springs of the elastic part react against the nut and bear against the jaws if the jaws are guided in the adapter member. If the jaws are guided in the nut, the elastic part reacts against the adapter member and bears against the jaws.

The novel features which are considered as characteristic of the invention are set forth in particular in the appended claims. The improved chuck itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a partly side elevational and partly longitudinal sectional view of a chuck which embodies one form of the invention;

FIG. 2 is a partly side elevational and partly longitudinal sectional view of a second chuck;

FIG. 3 is a partly side elevational view and partly longitudial sectional view of the adapter of the chuck shown in FIG. 2; and FIG. 3a is a front elevational view of the adapter as seen from the left-hand side of FIG. 3.

DESCRIPTION OF THE PREFERRED EMBODIMENTS

Referring first to FIG. 1, there is shown a three-jaw universal or self-centering drill chuck which comprises an elongated main body portion or adapter 1 having a rear portion or stem 1a and a front portion or hub 1b. The rearmost part 2 of the stem 1a is of polygonal (e.g., square) outline and can be fitted into or otherwise connected with a spindle (not shown) which is driven by a suitable motor to transmit to the chuck torque and impacts in a manner not forming part of the present invention.

The hub 1b of the adapter 1 includes an externally threaded cylindrical portion 3 located in front of a relatively narrow cylindrical flange 3a which is provided with one or more radially inwardly extending bores or sockets 4 for reception of a shaft of a removable chuck key. The hub 1b further includes a cylindrical projection 5 which extends forwardly from and is coaxial with the cylindrical portion 3. The diameter of the projection 5 is substantially less than that of the cylindrical portion 3. The portion 3 and the projection 5 are separated from each other by a ring-shaped shoulder 6.

The cylindrical portion 3 meshes with an adjusting member or pull-on nut 8. The nut 8 has an internally threaded cylindrical sleeve 7 formed with an annulus of large axially parallel external teeth 9 which can mate with the teeth of the bevel gear on the aforementioned chuck key when a shaft of the chuck key is inserted into one of the sockets 4. The chuck key may comprise two shafts. The front portion 10 of the nut 8 constitutes a hollow cone which tapers in a direction away from the sleeve 7 and whose smaller-diameter end is provided with an opening large enough to accommodate the shank of a drilling tool (not shown) as well as the front portions of at least two but preferably three jaws 11.

The internal surface 10' of the conical front portion 10 of the nut 8 is formed with two or more equidistant guide grooves (not shown), one for each of the jaws 11. It is assumed that the chuck of FIG. 1 comprises three jaws 11; therefore, the aforementioned grooves are disposed at 120 degrees with reference to each other and enable the respective jaws 11 to slide lengthwise of the adapter 1. The neighboring side faces of the jaws 11 are formed with blind bores 13 for the end convolutions of helical springs 12 which urge the jaws away from each other whereby the jaws tend to slide rearwardly, namely, toward the projection 5 of the hub 1b. Also, such springs insure that the jaws 11 remain in the respective guide grooves of the nut 8.

The projection 5 is surrounded by a ring-shaped motion transmitting and deforming member 14 which is movable axially as well as circumferentially of the hub 1b. An elastic part here shown as a dished spring 15 is inserted between the member 14 and the cylindrical portion 3 and tends to move the member 14 forwardly. The internal surface of the spring 15 surrounds and can be a press-fit on the shoulder 6. The spring 15 biases the member 14 against the rear end faces of the jaws 11. It will be seen that the spring 15 reacts against the adapter 1 and bears against the chucks 11 to bias the latter against the nut 8 and against the shank of a tool when such tool is inserted through the front opening of the nut.

The operation:

It is assumed that the polygonal portion 2 of the stem 1a is inserted into the receives motion from a hammer drill, not shown. In order to insert a tool into the chuck, the operator rotates the nut 8 in a counterclockwise direction so that the sleeve 7 moves forwardly of and away from the flange 3a. This enables the jaws 11 to move apart and to provide room for introduction of the shank of a suitable tool, not shown. Once the shank of the tool is received in the space between the jaws 11, the nut 8 is rotated by hand in a clockwise direction so that the sleeve 7 moves toward the flange 3a whereby the motion transmitting member 14 arrests the jaws 11. Thus, the conical portion 10 slides with reference to the jaws 11 so that the jaws move toward each other and begin to clamp the shank of the inserted tool. The final clamping action is applied by means of the chuck key whose shaft is inserted into one of the sockets 4 and which thereupon rotated by its arm so that the bevel gear of the chuck key rotates the sleeve 7 in a clockwise direction and effects a deformation of the dished spring 15. Such deformation is caused by the member 14 which moves axially of the projection 5 (toward the cylindrical portion 3) under the action of the internal surface 10' of the conical portion 10 which moves rearwardly in response to a clockwise rotation of the nut 8 by the chuck key. This results in the generation of a requisite clamping action between the external surface of the shank of a tool and the adjacent surfaces of the jaws 11.

The drill is thereupon put to use whereby the chuck rotates and is simultaneously subjected to a series of strong impacts acting in the axial direction of the adapter 1 so as to drive the tool into a body, for example, into a wall. The shocks to which the chuck is subjected produce unavoidable small movements between the nut 8 and the adapter 1, between the tool and the jaws 11, and/or between the nut 8 and the jaws 11, i.e., between all such clamping elements which form with the inserted tool a chain of parts cooperating to hold the tool against movement relative to the jaws 11 in response to a requisite axial movement of the nut toward the flange 3a. However, in contrast to the influence of such shocks on conventional chucks wherein the only force which holds the jaws in clamping engagement with the shank of the tool is a frictional engagement between the adapter and the nut of the chuck, and wherein such frictional engagement is either unduly increased, weakened or even terminated in response to repeated shocks which are produced in actual use of a hammer drill or an analogous impact tool, the deformed elastic part 15 of the aforementioned chain compensates for movements and insures that the forces acting between the tool and the jaws, between the jaws and the nut, and/or between the nut and the adapter change very little or not at all. Thus, the tool is safely held by the jaws 11 but is readily removable upon completion of the drilling operation.

The spring 15 ensures that the frictional engagement between the threads of the adapter 1 and 8 is a so-called soft engagement in contrast to the hard frictional engagement which develops in conventional chucks which rely for extremely strong compression of rubber rings or the like. The soft engagement is much more suited to avoid undesirable reduction of clamping forces when the chuck rotates and is simultaneously subjected to axially oriented shocks or impacts.

FIGS. 2 to 3a illustrate a second three-jaw self-centering drill chuck which is even more reliable than the chuck of FIG. 1. The adapter 101 of the second chuck has a stem 101a provided with a polygonal end portion 102 corresponding to the portion 2 of FIG. 1. The hub 101b of the adapter 101 has an axially extending blind bore 120 surrounded by a cylindrical surface located rearwardly of a conical internal surface 110' which tapers toward the stem 101a. The conical surface 110' is formed with three equidistant guide grooves 121 which accommodate jaws 111 for lengthwise movement. The neighboring side surfaces of the jaws 111 are provided with blind bores 112 for the end convolutions of helical springs 113 which are analogous to the springs 13 of FIG. 1.

The foremost portion of the hub 101b (namely, that portion which is provided with the conical internal surface 110') is formed with external threads 103 located in front of a relatively narrow annular flange 103a for one or more radial bores or sockets 104 corresponding to the sockets 4.

The threads 103 of the front portion of the hub 101b mate with internal threads of a cylindrical sleeve 107 forming part of an adjusting member or pull-on nut 108. The sleeve 107 has a set of large axially parallel external teeth 109 which can mesh with the teeth on the bevel gear of a chuck key when the shaft of such chuck key is inserted into one of the sockets 104. The nut 108 has an inwardly extending annular wall or collar 122 provided with a centrally located opening 123 large enough to readily accommodate the shank of the largest drilling tool which is to be held by the chuck of FIGS. 2 to 3a.

An elastic part here shown as a ring-shaped dished spring 115 is inserted into the chuck between the inner side of the collar 122 and the front end faces the jaws 111.

When the shank of a tool is caused to pass through the opening 123 and is inserted into the space between the jaws 111, the nut 108 is rotated, first by hand and thereupon by means of the chuck key, so as to subject the spring 115 to requisite deformation. This spring then acts not unlike the spring 15 of FIG. 1 and insures that the forces acting between the tool and the jaws 111, between the jaws and the nut 108, and/or between the nut and the adapter 101 change very little or not at all while the chuck rotates and is simultaneously subjected to strong impacts which drive the tool into a wall or the like. It was found that the chuck of FIG. 1 or FIGS. 2 to 3a is much less sensitive to shocks than presently known chucks.

An advantage of the chuck shown in FIGS. 2 to 3a is that relatively small displacements of the jaws 111 which occur in actual use under the influence of the drilling pressure tend to increase the clamping force between the shank of the inserted tool and the jaws 111 without causing the jaws to bite into the material of the nut or shank. This is due to the fact that the jaws 111 tend to move nearer to each other in response to lengthwise movement toward the stem 101a, i.e., away from the material into which the tool is being driven.

Without further analysis, the foregoing will so fully reveal the gist of the present invention that others can, by applying current knowledge, readily adapt it for various applications without omitting features which fairly constitute essential characteristic of the generic and specific aspects of our contribution to the art and, therefore, such adaptations should and are intended to be comprehended within the meaning and range of equivalence of the claims.

What is claimed as new and desired to be protected by Letters Patent is set forth in the appended.

1. A chuck, particularly a self-centering chuck for use in power-operated machines wherein the tool is subjected to impacts, comprising a plurality of clamping elements including at least two jaws movable into clamping engagement with a tool, an adapter member and an adjusting member, said adapter member slidably supporting said jaws for movement toward and away from each other and said members being relatively movable to thereby effect movement of said jaws relative to each other, the tool and the clamping elements together constituting a chain of parts which cooperate to clamp and hold the tool against movement with reference to said jaws, said chain of parts including --in addition to said jaws, said members and the tool-- at least one biasing element which is interposed between and reacts against said adjusting member and bears against said jaws to prevent relaxation of the clamping force between the tool and the jaws when the tool is subjected to impacts.

2. A chuck as defined in claim 1, wherein said biasing element includes at least one spring.

3. A chuck as defined in claim 2, wherein said spring is a dished spring.

4. A chuck as defined in claim 1, wherein said adjusting member is a pull-on nut which meshes with said adapter member and is provided with an annulus of external teeth, said adapter member having at least one socket adjacent to said annulus to receive the shaft of a toothed chuck key whose teeth are movable into mesh with the teeth of said annulus to facilitate rotation of said adjusting member by way of the chuck key.

5. A chuck as defined in claim 4, wherein the teeth of said annulus are parallel to the axis of said nut and said socket extends radially of such axis.

6. A chuck as defined in claim 4, wherein said socket is arranged to receive one shaft of a chuck key having two shafts.

7. A chuck as defined in claim 4, wherein the teeth of the chuck key form a bevel gear.

* * * * *